United States Patent [19]

DeYoung

[11] Patent Number: 4,658,274
[45] Date of Patent: Apr. 14, 1987

[54] MELT INK JET APPARATUS WITH MEANS AND METHOD FOR REPRIMING

[75] Inventor: Thomas W. DeYoung, Stormville, N.Y.

[73] Assignee: Exxon Printing Systems, Inc., Brookfield, Conn.

[21] Appl. No.: 661,925

[22] Filed: Oct. 16, 1984

[51] Int. Cl.⁴ .................... G01D 15/16; G01D 9/00
[52] U.S. Cl. .................................. 346/140 R; 346/1.1
[58] Field of Search .................. 346/1.1, 140 PD, 75

[56] References Cited

U.S. PATENT DOCUMENTS 4,419,677  12/1983  Kasugayama ............... 346/140 PD
4,475,116  10/1984  Sicking .......................... 346/140 PD
4,539,568   9/1985  Lewis ............................ 346/140 PD Primary Examiner—Joseph W. Hartary
Assistant Examiner—Mark Reinhart

[57] ABSTRACT

Ink jet apparatus utilizing hot melt ink and method of operation of that apparatus, the apparatus having a pressure source for repriming the system following non-use and freezing of the ink in the reservoir. The repriming operation may be carried out either manually or automatically, as long as permitted by the sensed level of the ink in the reservoir system.

16 Claims, 5 Drawing Figures

MELT INK JET APPARATUS WITH MEANS AND METHOD FOR REPRIMING

BACKGROUND OF THE INVENTION

This invention relates to ink jet apparatus for ejecting droplets of ink, and more particularly, to ink jet apparatus utilizing hot melt ink and having a system for repriming after depriming caused by reversion of the ink to its solid state when the apparatus is unused.

The use of hot melt ink in ink jet systems, which ink is normally in a solid or frozen state but attains a liquid state or phase when its temperature is raised, has presented a number of advantages to ink jet apparatus. For a discussion of the characteristics of such ink and the uses thereof, reference is made to U.S. Pat. No. 4,390,369 and pending U.S. applications U.S. Ser. No. 610,627, filed May 16, 1984; Ser. No. 565,127, filed Dec. 23, 1983; and Ser. No. 644,542 filed Aug. 27, 1984, all assigned to the same assignee as this invention and incorporated herein by reference.

While the use of hot melt ink has presented advantages as discussed in the above references, it also creates an additional requirement for the design of the apparatus, including a special need for frequent repriming of the system. One of the characteristics of hot melt type ink is that it degenerates faster the longer it is maintained in its liquid phase, with the result that it is advantageous to permit cooling and freezing of the ink when the apparatus is not in use. However, a problem arises from the fact that hot melt ink contracts when it cools to a temperature below the melting point, which contraction of the ink results in depriming of the system. Thus, such hot melt ink apparatus has an increased need for an efficient priming/repriming system.

SUMMARY OF THE INVENTION

It is an object of this invention to provide an ink jet repriming the system after depriming caused by permitting the hot melt ink to cool to its solid state while the apparatus is not in use.

Is is another object of this invention to provide an efficient, easily operable, and reliable priming system for use with hot melt ink apparatus.

It is another object of this invention to provide an efficient priming system and method for use with hot melt ink jet apparatus with control means to avoid depriming when the apparatus ink level is too low.

It is another object of this invention to provide an efficient priming system and method for an ink jet apparatus utilizing hot melt ink, the apparatus having a movable ink jet head, and with the bulk of the priming system located separately from the moving structure so as to minimize the mass of such moving structure.

In accordance with the above and other objects, the invention comprises ink jet apparatus utilizing hot melt ink, and a method of operating same, having a reservoir system for containing ink and a heating system for controlled heating of the ink to its melted phase when the apparatus is in use, and a priming system for applying priming pressure to the reservoir for repriming the system following non-use of the apparatus. Both manual and automatic modes of priming systems are disclosed, along with means for safeguarding against the priming operation when the ink level in the reservoir is below a predetermined dangerous level.

DESCRIPTION OF PREFERRED EMBODIMENTS

Figure 1:
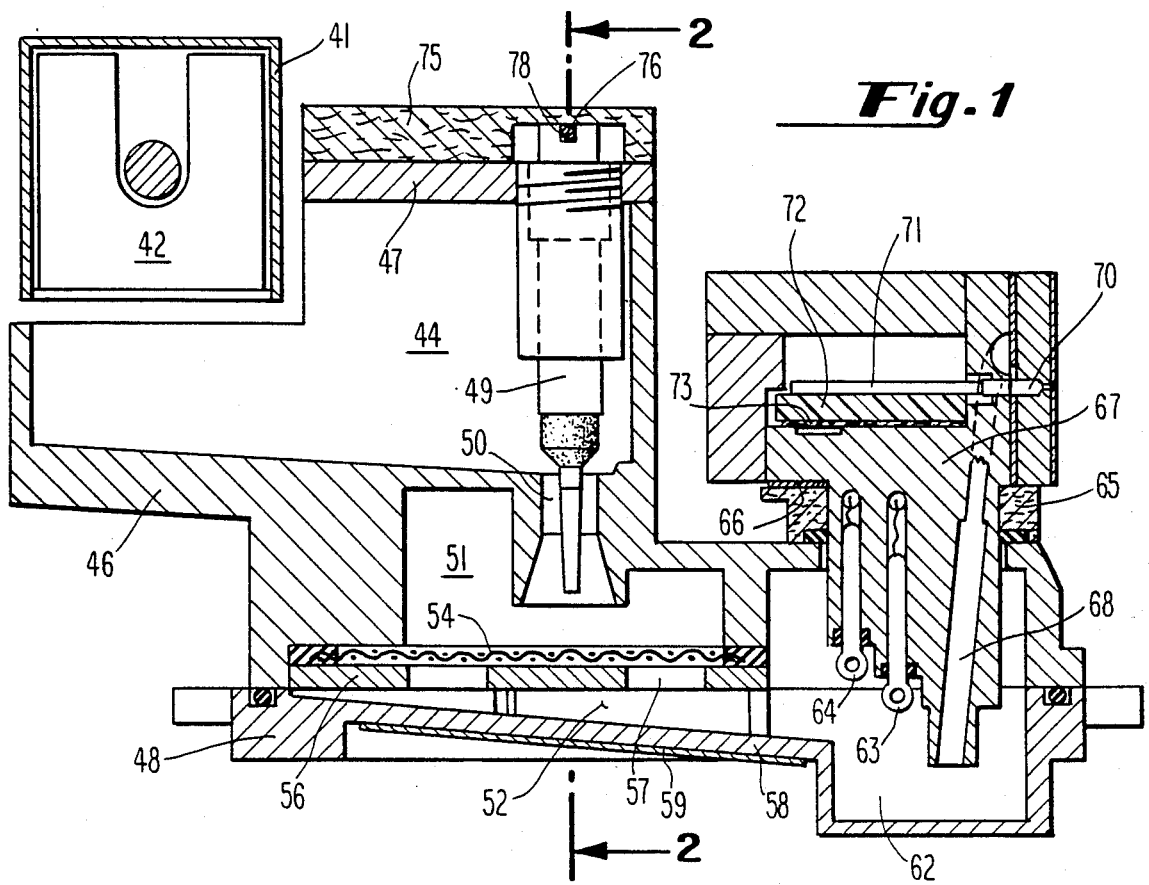
FIG. 1 is a side sectional view of an embodiment of the combined reservoir and ink jet head apparatus of this invention.

Referring first to FIG. 1, in the upper left hand corner there is illustrated a pellet carrier 41 containing an ink pellet 42. The pellet is deposited, by means not shown, into an upper reservoir 44 which is formed by a sloping base 46 and a reservoir cover 47. The base 46 is contiguous with and in thermal connection with a lower reservoir base 48 which extends across the bottom of the apparatus and which at the right hand side of the figure defines a well or sump 62, as discussed further herein below. The base portion 46 and lower reservoir base 48 are integrally constructed of an efficient heat conductive material, suitably a metal such as aluminum, to enable efficient conduction of heat through out the reservoir system as described in co-pending application Ser. No. 661,924 filed Oct. 16, 1984 assigned to the assignee of this invention and which is incorporated herein by reference. This enables melting of the pellet 42 after it has dropped onto the top surface of upper base 46, and also enables efficient and uniform heating of the melted ink that is maintained in the reservoir, including particularly the ink maintained in the well 62. Pellet 42 contains ink of the hot melt type, and the ink is maintained in the liquid phase at a predetermined normal operating temperature by heater 59 which is illustrated at the bottom of sloped section 58 of reservoir base 48.

Referring to the right hand portion of the reservoir as illustrated in FIG. 1, there is shown a valve 49 which is in its normally open position, in which position it provides a path through an opening 50 for flow of the melted ink down into a lower reservoir area 51. Reservoir portion 51 is bounded on its bottom by fine mesh screen filter 54, which removes unwanted particulates from the ink. The ink filters through screen 54 and passes through perforation holes 57 of plate 56, from where it passes by gravity feed down the tilted or sloped portion 58 of reservoir base 48 into the sump 62. Baffles 53 are shown within the post-filter portion of the reservoir 52, which baffles are designed to minimize the effect of sloshing of the ink in the reservoir which may occur due to movement of the apparatus. Under normal operating conditions, the ink supply is such that the ink level does not rise appreciably above filter 54, and thus the ink can be considered to be appreciably limited to residing in the post-filter portion 52 and the sump portion 62. Since valve 49 is normally in its open position, atmospheric pressure is applied to the liquid ink so that the ink in well 62 is under a pressure head.

A pair of level detectors 63, 64 are shown positioned to determine the level of the ink in the area of sump 62.

The detectors are connected, by means not shown, to indicators or automatic means for signaling the ink level, so that additional ink can be supplied to the reservoir 44 when needed by dropping another pellet 42 into it. Pressure on the ink within sump 62, as well as capillary action, draws ink through feed tube or passage 68, which communicates through a manifold to the input end of each orifice chamber 70, which chamber terminates in a standard orifice from which ink drops are expelled. As illustrated, a longitudinal transducer, suitably a piezo-electric type transducer 71 is provided. The overall apparatus comprises, at the ink jet head, an array of transducer-chamber combinations, each terminating in an orifice from which ink droplets are ejected, and supplied with ink through common passage 68 and a manifold in communication with each chamber. The transducers 71 are under the control of electronic drive circuitry illustrated as mounted on printed circuit 72, which printed circuit is separated by insulator 73 from the heat conductive print head block 67. Reference is made to co-pending U.S. application Ser. No. 604,128, filed April 26, 1984, now U.S. Pat. No. 4,544,932, which is incorporated herein by reference. The referenced application provides a disclosure of the structure and operation of an ink jet head, including many details which are necessary for efficient apparatus operation but which are not directly pertinent to an understanding of this invention.

Still referring to FIG. 1, a second heater 66 is provided in thermal contact with head element 67, to maintain the temperature of the ink passing up through feed tube 68 and into the chambers 70. This heater is normally kept in an operating state at all times, even when the apparatus is not in use, so as to always maintain ink in a liquid phase throughout the ink jet head and the length of feed tube 68. To render the operation of heater 66 efficient and independent of the heater 59, ink jet head element 67 is thermally insulated from the main reservoir housing portions 46, 48, 58 by insulator element 65. Details concerning the independence of the heater 59 and 66 are described in co-pending application Ser. No. 661,029, filed Oct. 15, 1984, now U.S. Pat. No. 4,607,266 assigned to the assignee of this invention and which is incorporated herein by reference.

Figure 2:
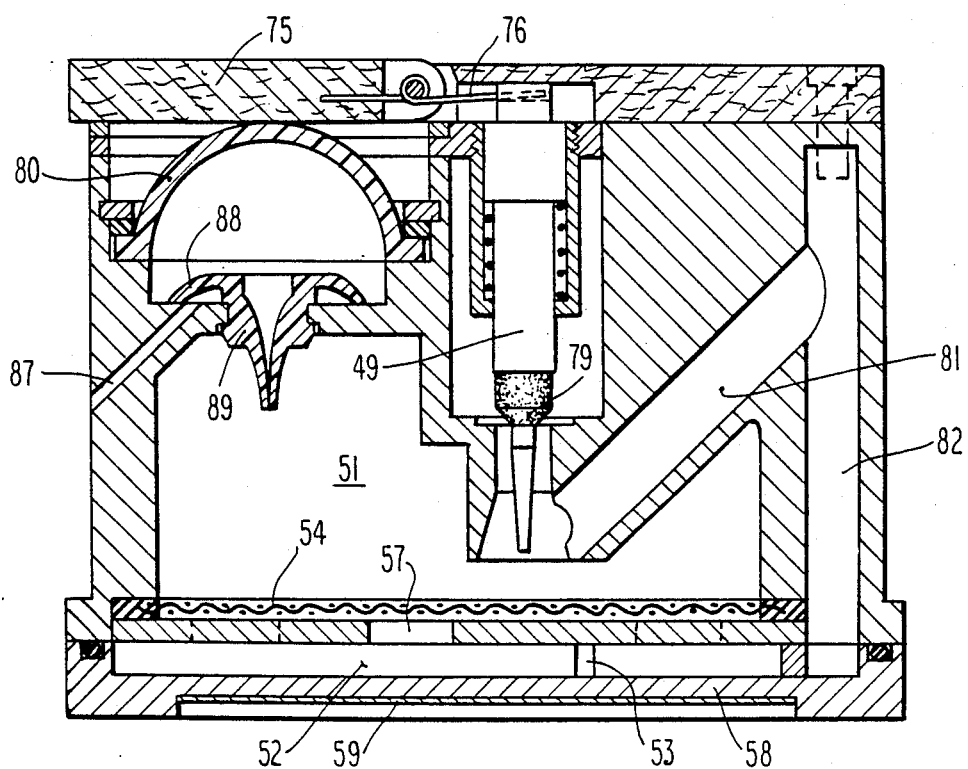
FIG. 2 is a sectional view along lines 2—2 of FIG. 1, of the apparatus of FIG. 1.

Referring to FIG. 2, there is shown a cross-sectional view taken along the lines 2—2 of FIG. 1, which illustrates additional structure utilized in priming and repriming the fluid system, e.g., following cooling and solidification of the melted ink. Hinged door 75 can be opened and has connected thereto a spring 76 which, when rotated clockwise due to opening of the door, presses valve 49 into its downward position. This causes a rubber tip portion 79 of the valve element to close the opening 50, thereby sealing off upper reservoir 44 from the outside and blocking fluid flow from reservoir portion 44 down into the lower reservoir portions 51, 52, and 62. As illustrated to the left of valve element 49, a hemispherical bulb 80 made of a flexible rubber-like material is positioned below door 75, such that it is easily accessible to an operator when door 75 is opened. Bulb 80 defines an inner space which communicates to a one-way valve 89 positioned directly below the bulb. When and only when door 75 is in its opened position, such that valve 49 is in its closed position, the operator can squeeze bulb 80 and expell air through the one-way valve 89, thus generating an air pressure within reservoir 44 for priming purposes. This priming pressure, which is suitably of the order of 2-3 psi, cannot escape through opening 50, but does find a pathway through filter 54 to the ink maintained in the lower reservoir portion 52 and the sump 62. Additionally, the priming pressure has a pathway through bypass channel 81 which couples into vertical channel 82 leading down into the area above sump 62. Thus, even if filter 54 is relatively clogged such that it presents a high impedence to the priming pressure, the priming system is rendered efficient through the bypass channels. The air pressure thus generated pushes ink up through feed 68 to purge the ink jet chamber 70 and the corresponding orifices. When the priming operation is terminated, the relative vacuum within the space defined by bulb 80 draws air through vent 87, forcing up the peripheral portion 88 of valve 89, to restore substantial atmospheric air pressure within the space of the bulb.

In operation of the embodiment of FIGS. 1 and 2, the operator must take care not to prime excessively and exhaust ink from the system to the point of forcing air up into the ink jet head. Such condition of pushing air into the ink jet head can have very adverse consequences, and indeed can result in complete loss of operation of the apparatus. The operator can avoid this by monitoring the visual output from level sensor 63, and terminating the priming operation as soon as a low level indication is provided. Level sensor 63 is suitably set to provide a low level indication with a margin of safety so that the priming or repriming operation is terminated safely before air is permitted to pass up through feed tube 68.

Figure 3:
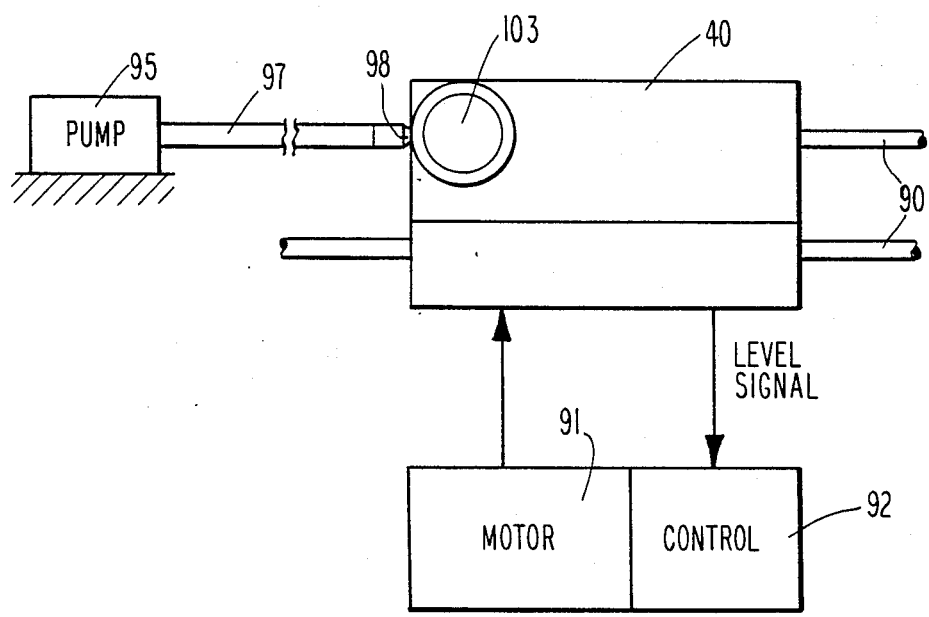
FIG. 3 is a schematic diagram of another embodiment of the priming system of this invention.
Figure 4:
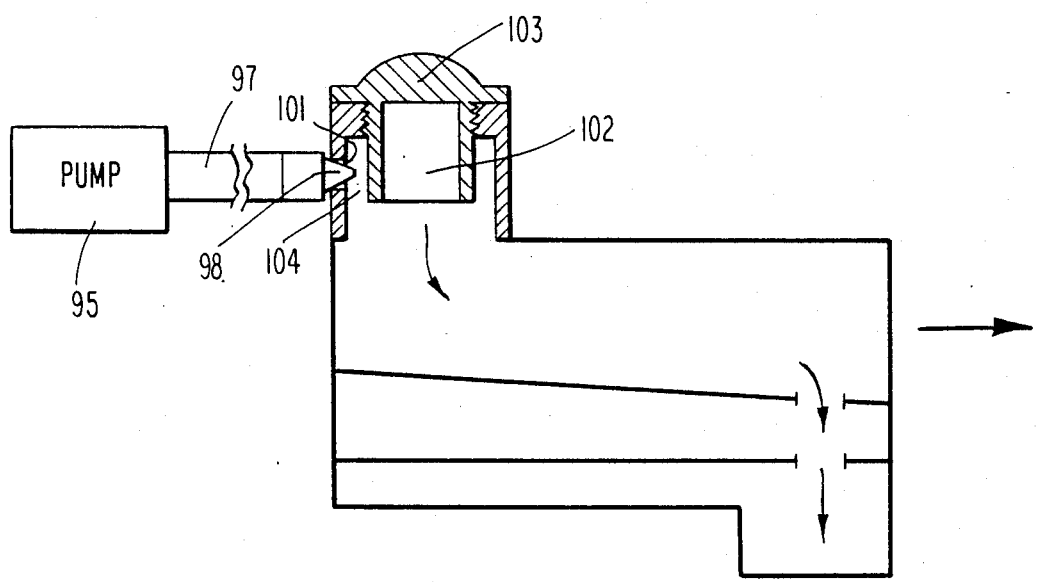
FIG. 4 is a sectional view of a portion of the embodiment of FIG. 3, showing the connection of the stationary priming pump with the movable reservoir apparatus.

Referring now to FIGS. 3 and 4, there is illustrated diagramatically another preferred embodiment of this invention, wherein the repriming operation is effected automatically. The print head and reservoir combination are illustrated at 40, mounted on rails 90. In a typical application, the apparatus 40 is transported by a motor, such as a stepper motor as illustrated at 91. Ink pellets are inserted through a removable cap or lid 103 and which contains a cartridge 102 which drops a pellet into the reservoir when the cap 103 is screwed into place. A pump 95 is mounted on the printing apparatus but off of the rails, such that it is stationary relative to the movable ink jet apparatus 40. This has the substantial advantage of taking the mass of the pump off of the carriage. Pump 95 has a connector 97 which terminates in a conical tip or nipple 98. Tip 98 is sized to fit into an otherwise normally open port 101 in the side of the housing of the apparatus 40. The tapered tip 98 is positioned such that when motor 91 carries apparatus 40 toward the pump, the tapered tip registers with and seals into port 101 to provide an effective air-tight seal. For a priming or repriming operation, motor 91 carries apparatus 40 to the position where the tip 98 is sealingly connected to the apparatus 40, connector 97 being spring mounted to hold tip 98 safely into the port 101. It is noted that in the absence of the connection, port 101 and passage 104 provide an open vent through which atmospheric pressure is maintained above the ink in the reservoir.

In operation of the automatic apparatus of FIGS. 3 and 4, priming is commenced by the operator controlling the motor to carry the apparatus 40 into connecting position with supply tip 98, and pump 95 then automatically provides the desired 2-3 psi of priming pressure. While the priming operation goes on, the level signal, as detected by level detector 63 illustrated in FIG. 1, is continuously monitored by control circuit 92. The priming operation is suitably timed to continue for a sufficient time to pass a predetermined amount of ink through the system and out of the jets. However, if at any time during this operation the level signal indicates that the ink level has dropped to the predetermined level, control circuit 92 causes motor 91 to immediately carry apparatus 40 away from its connected position, thereby terminating the priming operation while a safe amount of ink is still maintained in the reservoir. The operator then must replace the ink supply before again carrying out a priming operation.

In operation of any of the preferred embodiments of this invention, it is desirable to turn off the primary heater 59 when the ink jet apparatus is not being used. A characteristic of the hot melt type ink is that it degenerates more quickly the longer it is maintained in its molten state, making it practical to permit the bulk of the ink in the reservoir to freeze when the apparatus is not being used. Thus, heater 59 is turned off during non-use. Additionally, it will occasionally happen that the print head heater 66 is also turned off, such as when power is lost. All of the ink in the reservoir then cools below the freezing temperature, with resultant contraction and depriming of the system. When it is desired to restart operation of the apparatus, it is necessary to reprime the system, due to the fact that the cooling and freezing of the ink in the reservoir has a depriming effect.

Figure 5:
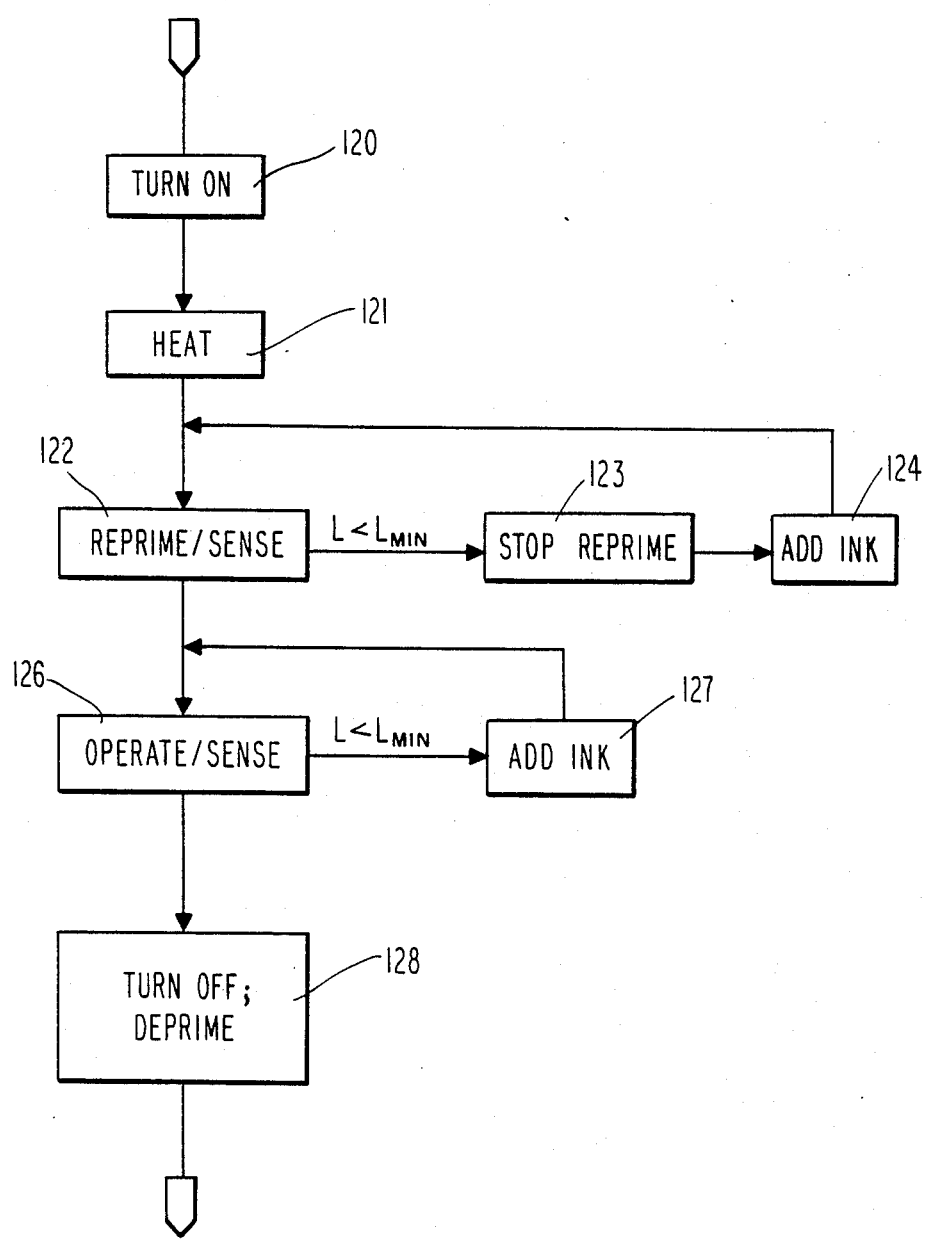
FIG. 5 is a flow diagram illustrating the steps of the method of this invention.

Referring now to FIG. 5, the flow diagram illustrates the steps to carry out the operation of the apparatus of this invention. The apparatus is turned on as illustrated at 120, followed by the heating of the ink at 121 to convert all of the ink to its liquid phase. Since the ink had been in its frozen or solid phase while the apparatus was unused, the system is deprimed and needs to be reprimed. The repriming step is carried out at block 122, and at the same time the ink level is continuously sensed, as by sensor 63 illustrated in FIG. 1. If at any time during the repriming operation the level L of the ink is sensed to be less than the minimum required level Lmin, then the repriming operation is terminated as illustrated at block 123. The operator then adds ink as at 124, following which the repriming operation recommences. When the repriming operation is completed, the apparatus can be operated as illustrated at 126. During the operation the ink level is continually sensed, and if at any time the level L is sensed to be below Lmin, then ink is added as shown at block 127. At the end of operation, the appatatus is turned off, as illustrated at 128. When both heaters 59 and 66 are turned off, the ink reverts to its solid or frozen state, with consequent depriming of the system.

A pellet delivery system for the pellets 42 as shown in FIG. 1 is described in co-pending application Ser. No. 660,655, filed Oct. 15, 1984 which is assigned to the assignee of this invention and incorporated herein by reference. Details concerning the ink jets including the chamber 70 are disclosed in co-pending application Ser. No. 661,794, filed Oct. 17, 1984, Ser. No. 576,582 filed Feb. 3, 1984, and U.S. Pat. No. 4,459,601, which are assigned to the assignee of this invention and incorporated herein by reference.

Although the specifics of the preferred embodiment have been disclosed herein, it is to be understood that other variations of the structure and mode of operation may be incorporated within the scope of the invention as claimed.

I claim:

1. A method of operating an ink jet apparatus, said apparatus having an ink supply system for supplying hot melt type ink to be ejected in the form of ink droplets, comprising;
   containing said ink in said ink supply system;
   normally heating all of said ink in said ink supply system when said apparatus is in use to maintain said ink in its melted phase;
   cooling said ink when said apparatus is not being used, whereby said ink reverts to its frozen phase, resulting in contraction of said ink and depriming of said apparatus;
   re-heating said frozen ink to its melted phase; and
   repriming said apparatus to eject ink through said supply system and out of said print head.

2. The method of claim 1, wherein said repriming step includes supplying a pressure of at least about two psi to said reservoir system.

3. The method of claim 2, further comprising venting said reservoir through a port when said apparatus is in use, and supplying said pressure through said port during said repriming.

4. The method of claim 2, wherein said repriming comprises manually generating said pressure.

5. The method of claim 2, wherein said repriming comprises automatically connecting a pressure source to said system to provide said pressure.

6. The method of claim 5, wherein said automatic connecting comprises moving said reservoir system and print head to a source of pressure.

7. The method of claim 1, comprising monitoring the level of ink in said reservoir during said repriming, and terminating repriming when said level is sensed to be below a predetermined level.

8. The method of claim 7, wherein said terminating comprises automatically terminating said repriming.

9. An ink jet apparatus for use with hot melt ink, said apparatus having a print head for ejection of ink droplets, a reservoir for maintaining ink for supply to said print head, and a heater for heating the ink maintained in said reservoir;
   said reservoir comprising a housing with a normally open port;
   closing means for closing said port; and
   repriming means operable only when said port is closed for providing air pressure into said reservoir whereby said apparatus is preprimed following re-heating of ink that had frozen, to convert said ink back to its melted phase.

10. The ink jet apparatus of claim 9, comprising ink feed means for feeding ink to said reservoir through said port.

11. The ink jet apparatus of claim 9, wherein said reservoir comprises a sump for collecting ink and feed means for transferring ink from said sump to said print head;
   a filter between said port and said sump; and bypass means providing an air flow bypass from above said filter to said sump, whereby pressure from said reprime means can bypass said filter.

12. The ink jet apparatus of claim 9, further comprising mounting means for fixedly mounting said repriming means to said reservoir housing.

13. The ink jet apparatus of claim 9, comprising movable carriage means for controlled moving of said reservoir and print head, a stationary mounting means for mounting said repriming means separate from said carriage, said repriming means comprising connection means for connecting to said reservoir in a sealed relationship when said carriage is positioned proximate to said repriming means.

14. The ink jet apparatus of claim 13, comprising ink level means for sensing the level of ink in said reservoir, and automatic control means responsive to said sensed level for disconnecting said reservoir and said repriming means when said ink level is at or below a predetermined level.

15. Ink jet apparatus for use with hot melt ink, comprising
a movable printing assembly including a motorized carriage, said assembly having a print head and reservoir for holding hot melt ink mounted on said carriage, heating means for heating the ink in said reservoir to maintain it in its melted phase when said apparatus is in use, and level sensing means for sensing the level of ink in said reservoir,
said reservoir having a normally open port which provides a vent to said reservoir,
pressure means mounted separately from said carriage for generating a priming pressure, and including connecting means for connecting said pressure means to said port when said carriage is proximate to said pressure means, and
control means for automatically positioning said carriage for connection of said pressure means and for moving said carriage so as to disconnect said pressure means when said ink level is below a predetermined level.

16. Ink jet apparatus for use with hot melt ink, comprising:
a printing assembly having a print head and a reservoir for holding hot melt ink,
heating means for heating the ink in said reservoir to maintain it in its melted phase when said apparatus is in use,
said reservoir having a normally open port which vents said reservoir when it is open, and
pressure means for generating a primary air pressure, said pressure means including means for delivering said air pressure through said port, whereby said port is a priming port during system priming.

* * * * *